(12) United States Patent
Dufford et al.

(10) Patent No.: US 9,132,811 B2
(45) Date of Patent: Sep. 15, 2015

(54) PARKING PAWL ENGAGEMENT CONTROL WITH FEEDBACK

(71) Applicant: Toyota Motor Engineering & Manufacturing North America, Inc., Erlanger, KY (US)

(72) Inventors: Mohammad E. Dufford, Los Angeles, CA (US); Heraldo F. Stefanon, Huntington Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 201 days.

(21) Appl. No.: 13/794,303

(22) Filed: Mar. 11, 2013

(65) Prior Publication Data

US 2014/0257643 A1    Sep. 11, 2014

(51) Int. Cl.
| | |
|---|---|
| *B60T 7/00* | (2006.01) |
| *B60T 7/12* | (2006.01) |
| *B60T 1/00* | (2006.01) |
| *B60T 1/06* | (2006.01) |
| *B60T 7/18* | (2006.01) |
| *F16D 63/00* | (2006.01) |
| *F16D 125/36* | (2012.01) |

(52) U.S. Cl.
CPC . *B60T 7/12* (2013.01); *B60T 1/005* (2013.01); *B60T 1/062* (2013.01); *B60T 7/18* (2013.01); *F16D 63/006* (2013.01); *F16D 2125/36* (2013.01)

(58) Field of Classification Search
CPC .............................. F16H 63/3416; B60T 1/005
USPC .......... 477/3, 7, 8, 15, 29, 45; 701/22, 37, 48, 701/51, 53, 54, 58, 67, 70
See application file for complete search history.

(56) References Cited

U.S. PATENT DOCUMENTS

| | | |
|---|---|---|
| 4,645,046 A | 2/1987 | Takano et al. |
| 4,854,195 A | 8/1989 | Moroto et al. |
| 4,892,014 A | 1/1990 | Morell et al. |
| 4,907,681 A | 3/1990 | Kuusik et al. |
| 5,696,679 A | 12/1997 | Marshall et al. |
| 5,794,748 A | 8/1998 | Heuver et al. |
| 6,209,408 B1 | 4/2001 | DeJonge et al. |
| 6,805,212 B2 | 10/2004 | Thomas |
| 7,284,648 B2 | 10/2007 | Reed et al. |
| 7,426,881 B2 | 9/2008 | Kozu et al. |
| 7,810,627 B2 | 10/2010 | Saitoh |

(Continued)

OTHER PUBLICATIONS

Hebbale et al.; "A Speed and Acceleration Estimation Algorithm for Powertrain Control"; American Control Conference; pp. 415-420; 1991.

*Primary Examiner* — Helal A Algahaim
*Assistant Examiner* — Jelani Smith
(74) *Attorney, Agent, or Firm* — Snell & Wilmer LLP

(57) ABSTRACT

A system and method for improving the consistency of a hybrid vehicle parking pawl engagement control. A hybrid vehicle includes a motor-generator, a planetary gear, a parking pawl, and a processor. The hybrid vehicle uses feedback to more accurately determine that the parking pawl is fully engaged. The parking pawl is applied to the planetary gear. The processor determines a target movement for the hybrid vehicle and commands a torque from the motor-generator to achieve the target movement. The processor determines that the parking pawl has fully engaged and locked the planetary gear.

20 Claims, 3 Drawing Sheets

(56) References Cited

U.S. PATENT DOCUMENTS

| | | |
|---|---|---|
| 7,934,590 B2 | 5/2011 | Duhaime et al. |
| 2005/0070391 A1 | 3/2005 | Folsom et al. |
| 2007/0213907 A1* | 9/2007 | Shimizu et al. ................. 701/51 |
| 2009/0043465 A1* | 2/2009 | Tomita ........................... 701/51 |
| 2010/0274454 A1* | 10/2010 | Nishimura et al. ............. 701/54 |
| 2011/0301818 A1 | 12/2011 | Hamade et al. |

* cited by examiner

PARKING PAWL ENGAGEMENT CONTROL WITH FEEDBACK

BACKGROUND

1. Field

The present disclosure relates to a system and method for controlling a parking pawl engagement, and more particularly to a system and method of improving the consistency of the hybrid vehicle parking pawl engagement control through feedback based on the vehicle movement.

2. Description of the Related Art

Conventional vehicles, i.e., vehicles having internal combustion engines, with automatic transmissions utilize a parking pawl to engage the transmission gears when the shifter is shifted into park. When fully engaged, the parking pawl locks up the output shaft of the transmission to prevent the vehicle from moving. Hybrid vehicles utilize similar parking pawls to prevent a planetary gear from moving while parked. In order to fully engage the parking pawl when the vehicle is parked, current hybrid vehicles apply a predetermined torque profile to move the planetary gear enough to let the parking pawl fully engage. However, due to various conditions, such as the hybrid vehicle being on an incline, the parking pawl may not be fully engaged after the torque application has completed. If the parking pawl was not fully engaged, the next time the engine starts or the planetary gear moves, the parking pawl will complete the engagement, which can cause an undesired vibration or movement of the vehicle. Further, current hybrid vehicles do not verify that the parking pawl was fully engaged after the parking pawl engagement control has been completed.

Thus, there is a need for a system and method directed to improving the consistency of the hybrid vehicle parking pawl engagement control.

SUMMARY

The present disclosure relates to a system and method for improving the consistency of the hybrid vehicle parking pawl engagement control. The applied torque profile includes feedback based on the vehicle movement to match a target movement.

In one implementation, a system for parking pawl engagement control of a hybrid vehicle comprises a plurality of wheels, a planetary gear, a motor-generator directly geared to the plurality of wheels through the planetary gear, a position sensor configured to detect an angle of the motor-generator, a parking pawl configured to engage the planetary gear, and a processor configured to lock the planetary gear by determining a target movement, applying the parking pawl and commanding a torque from the motor-generator based on the target movement such that the parking pawl engages the planetary gear, wherein the processor determines the planetary gear is locked when a vehicle movement matches the target movement.

In another implementation, a hybrid vehicle comprises a plurality of wheels, a planetary gear, a motor-generator directly geared to the plurality of wheels through the planetary gear, a position sensor configured to detect an angle of the motor-generator, a brake pedal, a brake pedal sensor configured to detect a position of the brake pedal, a parking pawl configured to engage the planetary gear, and a processor configured to lock the planetary gear by determining a target movement, applying the parking pawl and commanding a torque from the motor-generator based on the target movement such that the parking pawl engages the planetary gear, wherein the processor determines the planetary gear is locked when a vehicle movement matches the target movement.

In yet another implementation, a method for controlling a parking pawl engagement for a hybrid vehicle comprises starting a parking pawl engagement logic, applying a parking pawl to a planetary gear connected to a motor-generator and a plurality of wheels, determining a target movement for the hybrid vehicle, adjusting a torque from the motor-generator to the plurality of wheels until a vehicle movement matches the target movement, detecting the vehicle movement of the hybrid vehicle, and determining that the parking pawl has fully engaged the planetary gear.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

Apparatus, systems and methods that implement the implementations of the various features of the present disclosure will now be described with reference to the drawings. The drawings and the associated descriptions are provided to illustrate some implementations of the present disclosure and not to limit the scope of the present disclosure. Throughout the drawings, reference numbers are re-used to indicate correspondence between referenced elements.

Figure 1:
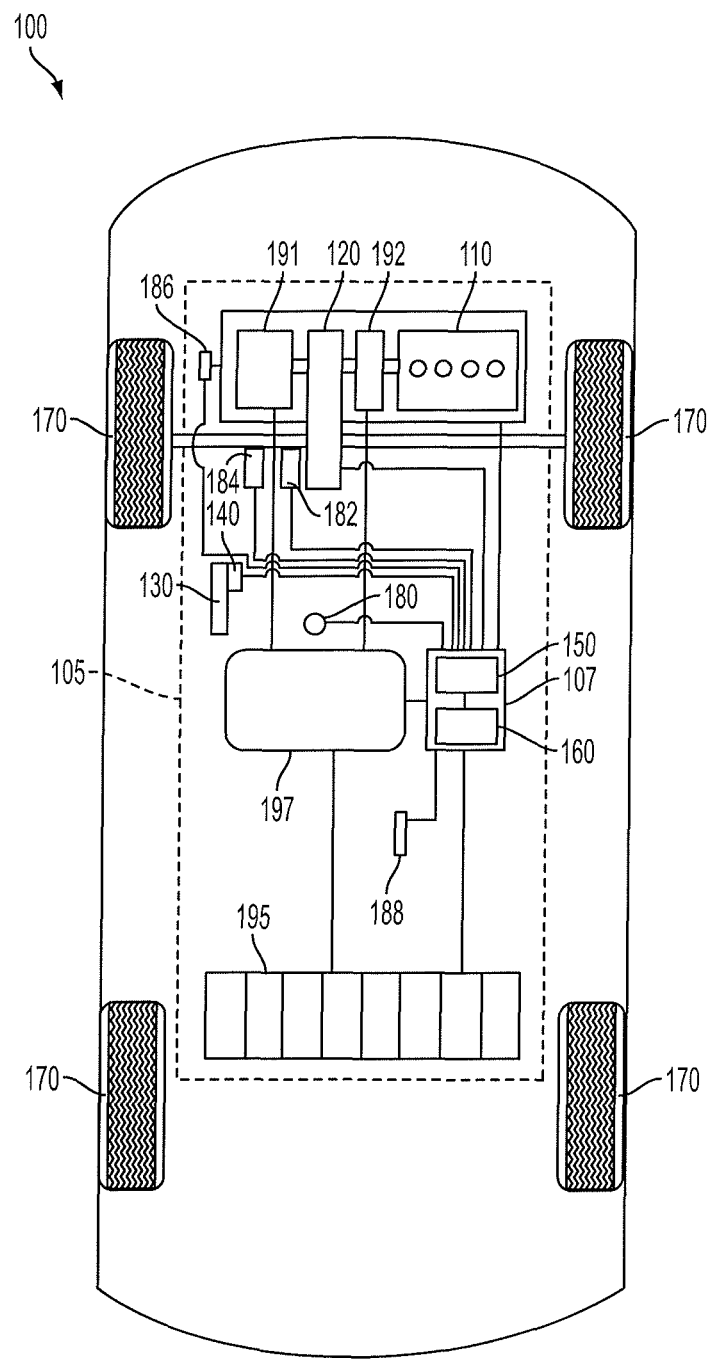
FIG. 1 is a block diagram of hybrid vehicle according to an implementation of the present disclosure.

One implementation of a hybrid vehicle 100 is shown in FIG. 1. The hybrid vehicle 100 can include a drive force unit 105 and wheels 170. The drive force unit 105 further includes an engine 110, an electric motor-generator 191, an electric motor-generator 192, a battery unit 195, an inverter box 197, a brake pedal 130, a brake pedal sensor 140, a transmission 120, a hybrid controller module 107, a shifter 180, a speed sensor 182, an accelerometer 184, a position sensor 186, and a sensor 188. The hybrid controller module 107 further includes a processor 150 and a memory 160.

The engine 110 primarily drives the wheels 170. The engine 110 can be an internal combustion engine. The internal combustion engine can combust fuel, such as gasoline, ethanol, diesel, biofuel, or other types of fuels which are suitable for combustion. The torque output by the engine 110 is received by the transmission 120. The motor-generators 191 and 192 can also output torque to the transmission 120. The engine 110 and the motor-generators 191 and 192 may be coupled through a planetary gear 210 (shown in FIG. 2A). The shifter 180 allows the driver to shift between gears, which may be simulated gears in the case of a hybrid vehicle or an electric vehicle. The transmission 120 delivers an applied torque to the wheels 170. The torque output by the engine 110 may not directly translate into the applied torque to the wheels 170.

The motor-generators 191 and 192 can serve as motors which output torque in a drive mode, and can serve as generators to recharge the battery unit 195 in a regeneration mode. The electric power delivered from or to the motor-generators 191 and 192 passes through an inverter box 197 to the battery unit 195.

The brake pedal sensor 140 can detect pressure applied to the brake pedal 130 or a position of the brake pedal 130, which may further affect the applied torque to the wheels 170. The speed sensor 182 is connected to an output shaft 220 (shown in FIG. 2A) of the transmission 120 to detect a speed input which is converted into a vehicle speed by the processor 150. The accelerometer 184 is connected to the body of the hybrid vehicle 100 to detect the acceleration or deceleration of the hybrid vehicle 100. The accelerometer 184 may be used to detect an actual movement of the hybrid vehicle 100. The position sensor 186 may be a high resolution position sensor connected to at least one of the motor-generators 191 and 192, and can detect an angle of the motor-generator 191 or 192 to determine a precise rotation. In certain implementations, the sensor 188 is a grade sensor configured to detect a grade of the surface on which the hybrid vehicle 100 is on. In other implementations, the sensor 188 is a sound or a vibration sensor, configured to detect a vibration or a motion sensor configured to detect a motion or movement of the hybrid vehicle 100.

The transmission 120 is a transmission suitable for a hybrid vehicle. The transmission 120 can be an ECVT (electrically controlled variable transmission), which is coupled to the engine 110 as well as the motor-generators 191 and 192. The transmission 120 can deliver torque output from a combination of the engine 110 and the motor-generators 191 and 192. The processor 150 controls the transmission 120, using input from the shifter 180 and utilizing data stored in the memory 160 to determine the applied torque delivered to the wheels 170. For example, the processor 150 may determine that at a certain vehicle speed, the engine 110 should provide a fraction of the applied torque to the wheels 170 while the motor-generator 191 provides most of the applied torque. The processor 150 and the transmission 120 can control an engine speed of the engine 110 independently from the vehicle speed.

Figure 2A:
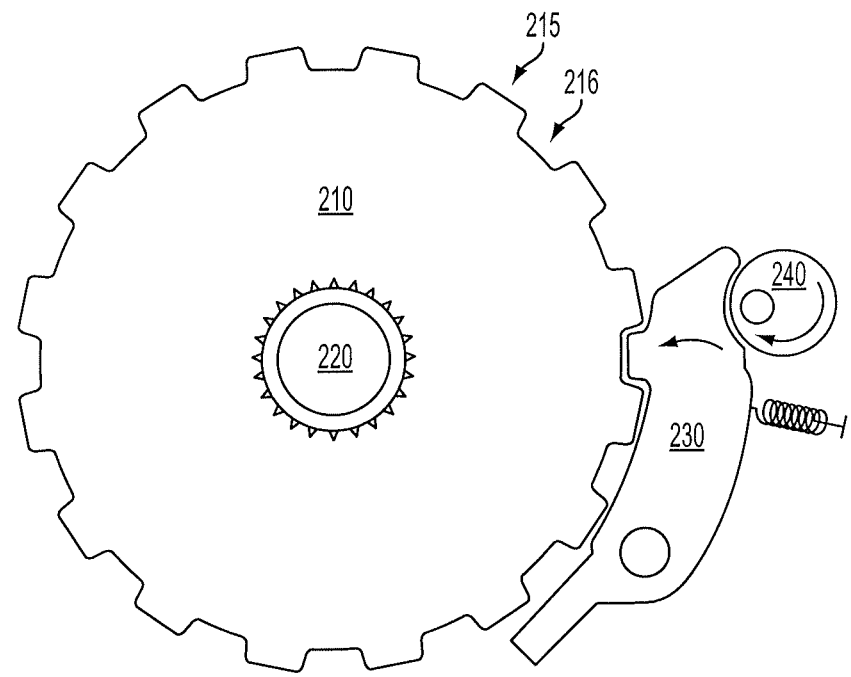
FIG. 2A is a diagram of a parking pawl fully engaging a planetary gear according to an implementation of the present disclosure.

FIG. 2A depicts a portion of the transmission 120. The output shaft 220 is connected to the wheels 170 to provide a torque to the wheels 170. The planetary gear 210 is connected to the output shaft 220, to control the torque provided to the wheels 170. The planetary gear 210 includes a plurality of teeth 215 having a groove 216 between consecutive pairs of teeth 215. A parking pawl 230, which is controlled by an actuator 240, fits between consecutive teeth 215 and into a groove 216, which prevents the planetary gear 210 as well as the output shaft 220 from rotating. In alternative implementations, the parking pawl 230 may instead fit into a notch of the output shaft 220 to prevent the output shaft 220 from rotating. The actuator 240 may be directly controlled by the shifter 180 through a mechanical link, or may be electronically controlled by the processor 150.

Figure 2B:
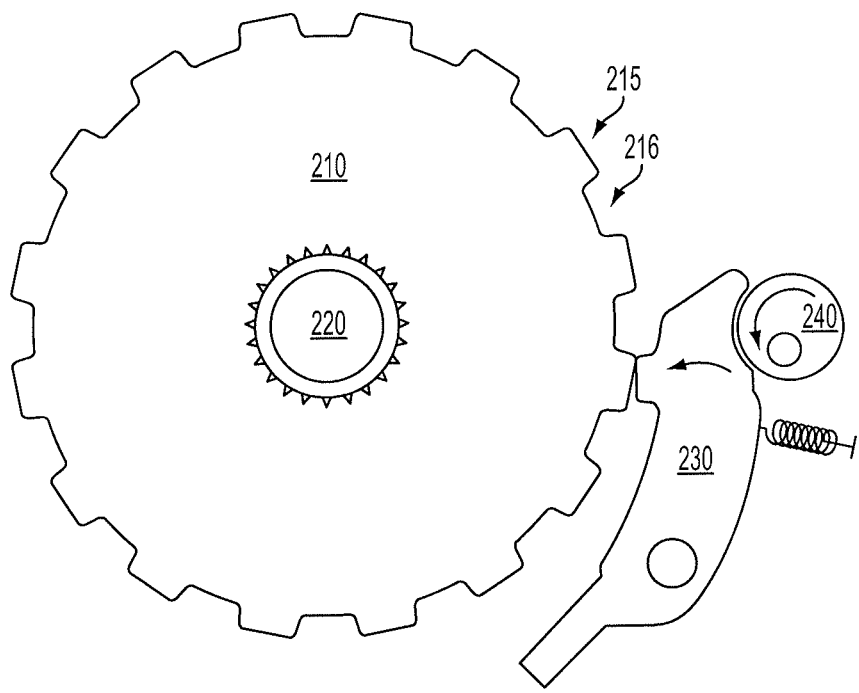
FIG. 2B is a diagram of a parking pawl partially engaging a planetary gear according to an implementation of the present disclosure.

FIG. 2B illustrates when the parking pawl 230 has not fully engaged the planetary gear 210. When the hybrid vehicle 100 stops, the planetary gear 210 may stop at an orientation which initially prevents the parking pawl 230 from fitting into a groove 216. The parking pawl 230 may be disposed against a tooth 215 instead, as in FIG. 2B.

In hybrid vehicles, because of a lack of a torque converter or clutch, the engine 110 and the motor-generators 191 and 192 are more directly connected to the wheels 170. When the hybrid vehicle 100 is later started, the motor-generators 191 or 192 crank up the engine 110. When the parking pawl has not fully engaged the planetary gear 210, the motor-generator 191 or 192 causes the planetary gear 210 to rotate, rather than engage the engine 110. The planetary gear 210 is not locked, so the motor-generator 191 or 192 has no support to push against. As a result, the motor-generator 191 or 192 cannot smoothly crank up the engine 110, which may put undue stress on components and further cause undesirable movement for the driver and the vehicle. The driver can feel the vehicle movement or a vibration before the parking pawl 230 fully engages the planetary gear 210.

In current hybrid systems, the parking pawl engagement control applies a predetermined torque without confirming that the planetary gear 210 has actually locked up against the parking pawl 230. The predetermined torque corresponds to a predetermined movement, which corresponds to a width of a tooth 215. However, the predetermined torque may only be sufficient to achieve the predetermined movement on a flat road, with no extra load on the vehicle. The hybrid vehicle 100 utilizes feedback to better determine that the planetary gear 210 has indeed locked up against the parking pawl 230.

Figure 3:
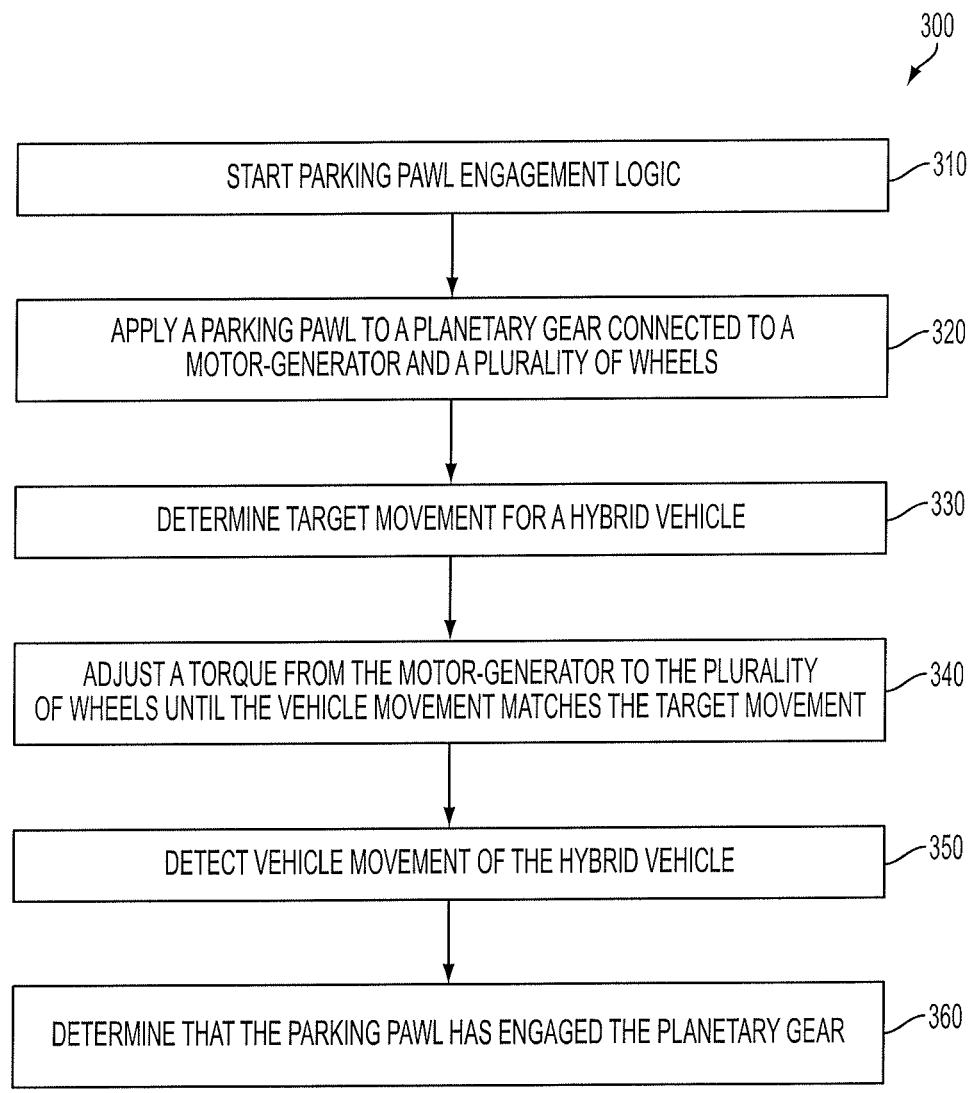
FIG. 3 is a flowchart of a method of improving the consistency of the hybrid vehicle parking pawl engagement control according to an implementation of the present disclosure.

FIG. 3 illustrates a flowchart 300 of a method for improving the hybrid vehicle parking pawl engagement control. At 310, the processor 150 starts the parking pawl engagement logic. The driver may trigger the parking pawl engagement logic, alerting the processor 150 to start the logic. The parking pawl engagement logic may be triggered when the hybrid vehicle 100 is stopped, the shifter 180 is shifted to park, and the brake pedal 130 is released. These conditions ensure that the hybrid vehicle 100 is not damaged. The hybrid vehicle 100 is stopped to ensure that the transmission 120, including the planetary gear 210 and the parking pawl 230, are not damaged. The shifter 180 shifting to park and the release of the brake pedal 130 indicate the driver's intent to park, rather than begin driving. However, alternative implementations may use different combinations of various trigger conditions, such as only being shifted to park.

Certain conditions may prevent the parking pawl engagement logic from starting, or may disable the parking pawl engagement logic. If the sensor 188 is a grade sensor that detects too steep of a grade, the parking pawl engagement logic is disabled. The force of gravity is available to ensure the parking pawl 230 has engaged and locked the planetary gear 210. Moreover, the hybrid vehicle 100 may require too great of a torque to overcome the force of gravity and move the hybrid vehicle 100 forward. The torque required may require starting the engine 110, or may cause an unnatural vehicle motion. In one implementation, the parking pawl engagement logic is disabled when the hybrid vehicle 100 is outside of a grade threshold window. The grade threshold window may be between +10% and −10%, or between +5% and −5%, or any other suitable range. The grade threshold window may be predetermined, or may be determined by the processor 150, using feedback from the parking pawl engagement logic. Moreover, the parking pawl engagement logic may adjust the grade threshold window if the grade threshold window is too wide or too narrow.

At 320, the processor 150 applies the parking pawl 230 to the planetary gear 210. Because the planetary gear 210 is connected to the motor-generators 191 and 192 as well as the wheels 170, preventing the planetary gear 210 from rotating effectively stops movement of the hybrid vehicle 100. However, applying the parking pawl 230 does not guarantee that the planetary gear 210 is actually locked and prevented from rotating because the parking pawl 230 may initially rest on a tooth 215. In other words, the planetary gear 210 may have stopped in an orientation which prevents the parking pawl 230 from moving into a groove 216 to fully engage.

At 330, the processor 150 determines a target movement for the hybrid vehicle 100. The processor 150 may also determine a target speed for the hybrid vehicle 100. The target movement and the target speed are selected to ensure that the hybrid vehicle 100 moves enough to fully engage the parking pawl 230 when the parking pawl 230 is applied. The target movement and the target speed may be based on predetermined values, such as values stored in the memory 160. The values may correspond to a threshold movement to ensure the parking pawl 230 is fully engaged. The threshold movement may correspond to a width of a tooth 215. The hybrid vehicle 100 must be sufficiently moved such that the planetary gear 210 rotates the tooth 215 out of the path of the parking pawl 230. After determining the target movement and the target speed, the processor 150 may apply a corresponding target torque.

The target movement and the target speed may also be determined from feedback from the various sensors. The sensor 188 may be a grade sensor that detects that the hybrid vehicle 100 is on an uphill road, which may require a greater target torque to compensate for the grade. If the hybrid vehicle 100 is on a downhill road, the predetermined values stored in the memory 160 may be too great, causing an undesirable motion for the driver or the vehicle. The processor 150 may further select the target movement and the target speed to minimize or reduce too fast or too strong movement, which can jerk the driver or the vehicle. Because the processor 150 utilizes feedback to adjust the torque as needed, the processor 150 may initially select a target torque that may be less than required. The processor 150 can perform subsequent adjustments based on feedback.

At 340, the processor 150 adjusts a torque from the motor-generator 191 or 192 to the wheels 170 until a vehicle movement of the hybrid vehicle 100 matches the target movement. The processor 150 may have commanded a torque at 330, or may start applying a torque at 340 (i.e., adjusting a 0 torque). The processor 150 may also adjust the torque until a vehicle speed of the hybrid vehicle 100 matches the target speed. The target movement and the target speed are chosen or determined to ensure that the hybrid vehicle 100 moves the minimum amount to get the parking pawl 230 to fully engage the planetary gear 210.

The torque may be adjusted as needed, such as adjusted multiple times or continuously adjusted, until the vehicle movement and the vehicle speed match the target movement and the target speed. The vehicle movement and the vehicle speed are detected through one or more of the speed sensor 182, the accelerometer 184, the position sensor 186, and/or the sensor 188. The sensor 188 may be one or more of a grade sensor and a GPS unit, to determine the vehicle movement and the vehicle speed. Therefore, 330 and 340 may be repeated as needed until the vehicle movement matches the target movement.

In addition, the processor 150 may use feedback to optimize the target movement. The processor 150 may use a grade detected by the sensor 188, along with a weight of the hybrid vehicle 100 detected through a weight sensor or other appropriate means, to calculate the target torque. The memory 160 may also store feedback data from previous applications of the parking pawl engagement logic to learn and adjust an optimal target torque.

At 350, the processor 150 detects a vehicle movement of the hybrid vehicle 100. The processor 150 uses data from the position sensor 186 to detect the vehicle movement. In one implementation, the position sensor 186 detects the rotation of the motor-generator 191 or 192 by detecting the change in angle of the motor-generator 191 or 192 itself, measured in degrees. Because the motor-generator 191 or 192 is connected to the planetary gear 210, and the planetary gear 210 is connected to the wheels 170, detecting the rotation of the motor-generator 191 or 192 effectively detects the vehicle movement. The rotation can also be used to calculate the vehicle speed. In addition, the processor 150 may utilize the speed sensor 182 and the accelerometer 184 to detect the vehicle movement. The processor 150 may continuously monitor the vehicle movement.

At 360, the processor 150 determines that the parking pawl has fully engaged the planetary gear 210. In one implementation, the processor 150 detects, through an appropriate sensor, a current from the motor-generator 191 or 192. The sensor may be included in the hybrid controller module 107, may be the sensor 188, or may be another sensor connected to the motor-generators 191 or 192. The processor 150 commands the torque from the motor-generator 191 or 192. When the parking pawl 230 is fully engaged, the planetary gear 210 is locked and unable to rotate. Similarly, the motor-generator 191 or 192 is unable to rotate, which causes a change in a current from the motor-generator 191 or 192. Thus, the change in current indicates that the planetary gear 210 is not moving when a torque is applied. When the hybrid vehicle 100 moves, at 340, then stops moving, at 350, the processor 150 may determine that the vehicle movement has allowed the parking pawl 230 to fully engage the planetary gear 210. The processor 150 then stops the torque from being applied.

In other implementations, the processor 150 may determine that the parking pawl 230 has fully engaged the planetary gear 210 through the use of other sensors. When the parking pawl 230 engages the groove 216, a vibration or sound of the parking pawl 230 contacting a groove 216 may be detected by an appropriate sensor. The sensor 188 may be a sound, vibration or motion sensor placed on or near the parking pawl 230 to detect the sound, vibration or motion of the parking pawl 230. Alternatively, a sensor may be placed on the parking pawl 230 capable of detecting the parking pawl 230 contacting a groove 216.

The processor 150 may repeat 330-350, or segments thereof, as needed until the processor 150 determines that the parking pawl 230 has fully engaged the planetary gear 210. The processor 150 may update the target movement as it receives feedback. The vehicle movement and the vehicle speed may indicate that the hybrid vehicle 100 is not moving, which indicates that the torque applied was insufficient. For instance, if the hybrid vehicle 100 was on an incline, the torque applied may be insufficient to overcome gravity in addition to the normal friction and inertia. The processor 150 may then accordingly increase the torque applied. Once the hybrid vehicle 100 starts moving, the processor 150 may subsequently reduce the torque applied.

If the hybrid vehicle 100 was on a decline, the torque applied may be too strong. The processor 150 would detect that the vehicle movement and/or the vehicle speed are too great and accordingly adjust the torque applied.

The processor 150 can also skip 330-350, or segments thereof, as needed. The parking pawl 230 may fully engage the planetary gear 210 sooner than expected by the processor

150. For example, if the hybrid vehicle 100 was on a decline, the hybrid vehicle 100 would move further than expected from the applied torque due to gravity. When the vehicle movement and the vehicle speed indicate that the hybrid vehicle 100 has stopped, the processor 150 may continue to increase torque to move the hybrid vehicle 100. The processor 150 may detect a change in the current from the motor-generator 191 or 192. The processor 150 ramps up the applied torque until the applied torque reaches a threshold torque. The threshold torque prevents the processor 150 from continuing to ramp up the applied torque if the parking pawl engagement occurs sooner than expected.

The processor 150 may also utilize feedback from other sensors to make more accurate calculations. The sensor 188 may be a grade sensor accurate enough to allow the processor 150 to consider the grade and the effects of gravity in determining the target movement and the target speed. The sensor 188 may be a weight sensor providing a load estimate to better calculate a required torque to move the hybrid vehicle 100.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A system for parking pawl engagement control of a hybrid vehicle comprising:
   a plurality of wheels;
   a planetary gear;
   a motor-generator geared to the plurality of wheels through the planetary gear;
   a parking pawl for engaging the planetary gear; and
   a processor configured to:
      determine a target torque value of the motor-generator based on at least one of a target movement value that corresponds to a movement of the hybrid vehicle or a target speed value that corresponds to a speed of the hybrid vehicle, and
      adjust the target torque value based on feedback data corresponding to a detected condition or a current movement of the hybrid vehicle, wherein the adjustment of the target torque value optimizes engagement of the parking pawl with the planetary gear.

2. The system of claim 1, further comprising a memory for storing values used by the processor to determine the target movement value.

3. The system of claim 1, further comprising a position sensor configured to detect a rotation angle of the motor-generator,
   wherein the feedback data includes the detected rotation angle of the motor-generator.

4. The system of claim 1, wherein the processor is configured to determine that the planetary gear is locked when the processor increases a torque outputted by the motor-generator, detects no vehicle movement, and detects a change in a current from the motor-generator.

5. The system of claim 1, further comprising a grade sensor, wherein the processor does not command a torque to be outputted by the motor-generator when the grade sensor detects a grade outside of a grade threshold window.

6. A hybrid vehicle comprising:
   a plurality of wheels;
   a planetary gear;
   a motor-generator geared to the plurality of wheels through the planetary gear;
   a grade sensor for detecting a grade of a surface upon which the hybrid vehicle is positioned;
   a sensor configured to detect feedback data indicating a detected condition of the hybrid vehicle or a current movement of the hybrid vehicle;
   a brake pedal;
   a brake pedal sensor configured to detect a position of the brake pedal;

a parking pawl configured to engage the planetary gear; and a processor configured to:
determine a target torque value based on the detected grade and at least one of a target movement value that corresponds to a movement of the hybrid vehicle or a target speed value that corresponds to a speed of the hybrid vehicle,
command a torque to be outputted by the motor-generator based on the target torque value, and
adjust the target torque value based on the detected feedback data for optimizing engagement of the parking pawl with the planetary gear, wherein the processor is configured to determine that the planetary gear is locked when the current movement of the hybrid vehicle is equal to or greater than the target movement value.

7. The hybrid vehicle of claim 6, further comprising a memory for storing values used by the processor to determine the target movement value.

8. The hybrid vehicle of claim 6, further comprising a position sensor configured to detect a rotation angle of the motor-generator,
wherein the current movement of the hybrid vehicle is determined based on the detected rotation angle of the motor-generator.

9. The hybrid vehicle of claim 6, wherein the processor is configured to determine that the planetary gear is locked when the processor increases the torque to be outputted by the motor-generator, detects no vehicle movement, and detects a change in a current from the motor-generator.

10. The hybrid vehicle of claim 6, wherein the processor does not command the torque to be outputted by the motor-generator when the detected grade is outside of a grade threshold window.

11. A method for controlling a parking pawl engagement for a hybrid vehicle comprising:
applying a parking pawl to a planetary gear connected to a motor-generator and a plurality of wheels;
determining at least one of a target movement value for the hybrid vehicle or a target speed value for the hybrid vehicle;
determining a target torque value based on at least one of the target movement value or the target speed value;
detecting, using at least one sensor, feedback data corresponding to at least one of a detected condition of the hybrid vehicle or a current movement of the hybrid vehicle;
adjusting the target torque value based on the feedback data; and
outputting a torque by the motor-generator to the plurality of wheels based on the adjusted torque value until the current movement of the hybrid vehicle matches or exceeds the target movement value.

12. The method of claim 11, wherein the steps of determining the target torque value, detecting, using the at least one sensor, the feedback data, adjusting the target torque value, and outputting the torque by the motor-generator are repeated until the parking pawl has fully engaged the planetary gear.

13. The method of claim 11, wherein the adjusting step of outputting the torque by the motor-generator is performed until the adjusted target torque value is reached.

14. The method of claim 11, further comprising adjusting the torque outputted by the motor-generator to the plurality of wheels based on the adjusted target torque value to regulate a movement or a speed of the vehicle.

15. The method of claim 11, further comprising starting a parking pawl engagement logic when the hybrid vehicle is shifted into park and a brake pedal is released.

16. The method of claim 15, wherein the parking pawl engagement logic is disabled when the hybrid vehicle is on a surface having a grade outside a grade threshold window.

17. The method of claim 16, wherein the parking pawl engagement logic is configured to adjust the grade threshold window.

18. The method of claim 11, further comprising determining that the parking pawl has fully engaged the planetary gear when the motor-generator does not rotate and produces a change in a current.

19. The method of claim 11, further comprising determining that the parking pawl has fully engaged the planetary gear when a vibration is detected from the parking pawl.

20. The method of claim 11, wherein the step of outputting the torque by the motor-generator to the plurality of wheels is performed until a speed of the vehicle matches or exceeds the target speed value.

* * * * *